US00RE46109E

(19) United States
(12) Reissued Patent
Odinak et al.

(10) Patent Number: US RE46,109 E
(45) **Date of Reissued Patent: *Aug. 16, 2016**

(54) VEHICLE NAVIGATION SYSTEM AND METHOD

(75) Inventors: Gilad Odinak, Bellevue, WA (US); Alastair Bruce Sutherland, Seattle, WA (US)

(73) Assignee: LG ELECTRONICS INC., Seoul (KR)

( * ) Notice: This patent is subject to a terminal disclaimer.

(21) Appl. No.: 11/352,520

(22) Filed: Feb. 10, 2006

Related U.S. Patent Documents

Reissue of:
(64) Patent No.: 6,691,026
Issued: Feb. 10, 2004
Appl. No.: 10/142,670
Filed: May 10, 2002

U.S. Applications:
(63) Continuation-in-part of application No. 09/884,856, filed on Jun. 18, 2001, now Pat. No. 6,487,494.

(60) Provisional application No. 60/364,538, filed on Mar. 15, 2002, provisional application No. 60/280,378, filed on Mar. 29, 2001.

(51) Int. Cl.
*G01G 1/00* (2006.01)
*G01C 21/34* (2006.01)
*G01C 21/00* (2006.01)
*G08G 1/0968* (2006.01)

(52) U.S. Cl.
CPC ..... *G08G 1/0968* (2013.01)

(58) Field of Classification Search
USPC ..... 701/200–202, 208, 211, 213–214, 420, 701/426, 526, 400; 340/988; 342/357.09
See application file for complete search history.

(56) References Cited

U.S. PATENT DOCUMENTS 4,052,568 A 10/1977 Jankowski
4,625,083 A 11/1986 Poikela (Continued)

FOREIGN PATENT DOCUMENTS

DE 19516647 11/1996
EP 0461888 3/1995

(Continued)

OTHER PUBLICATIONS

Zhao, Yilin, Efficient and reliable data transmission for cellular and GPS based mayday systems, Intelligent Transportation System, 1997. ITSC'97, IEEE Conference. pp. 555-559, Nov. 9-12, 1997, Boston, MA, USA, entire document.

(Continued)

*Primary Examiner* — Yonel Beaulieu
(74) *Attorney, Agent, or Firm* — Dentons US LLP

(57) ABSTRACT

A vehicle navigation system and method. The system includes a unit located in a vehicle and coupled to a first network, a traffic information center coupled to a second network, and a server coupled to the first and second networks. A trip plan is generated according to navigation information, vehicle coordinates and trip request information received from the unit, and road information received from the traffic information center. The trip plan is sent to the unit for presentation. The trip plan includes trip overview information and voice prompts associated with one or more landmarks. A trip plan may be a tourist trip plan.

20 Claims, 4 Drawing Sheets

(56) References Cited

U.S. PATENT DOCUMENTS

| | | | |
|---|---|---|---|
| 4,630,304 | A | 12/1986 | Borth et al. |
| 4,759,212 | A | 7/1988 | Sawada et al. |
| 4,827,500 | A | 5/1989 | Binkerd et al. |
| 4,876,710 | A | 10/1989 | Reed et al. |
| 4,878,170 | A | 10/1989 | Zeevi |
| 4,918,732 | A | 4/1990 | Gerson et al. |
| 5,029,233 | A | 7/1991 | Metroka |
| 5,062,132 | A | 10/1991 | Yasuda et al. |
| 5,168,277 | A | 12/1992 | LaPinta et al. |
| 5,259,018 | A | 11/1993 | Grimmett et al. |
| 5,263,181 | A | 11/1993 | Reed |
| 5,357,513 | A | 10/1994 | Kay et al. |
| 5,371,901 | A | 12/1994 | Reed et al. |
| 5,414,624 | A | 5/1995 | Anthonyson |
| 5,539,810 | A | 7/1996 | Kennedy, III et al. |
| 5,564,796 | A | 10/1996 | Saito et al. |
| 5,570,087 | A | 10/1996 | Lemelson |
| 5,649,055 | A | 7/1997 | Gupta et al. |
| 5,668,854 | A | 9/1997 | Minakami et al. |
| 5,712,788 | A | 1/1998 | Liaw et al. |
| 5,719,921 | A | 2/1998 | Vysotsky et al. |
| 5,729,531 | A | 3/1998 | Raith et al. |
| 5,732,074 | A | 3/1998 | Spaur et al. |
| 5,749,072 | A | 5/1998 | Mazurkiewicz |
| 5,761,638 | A | 6/1998 | Knittle et al. |
| 5,777,580 | A | 7/1998 | Janky et al. |
| 5,805,079 | A | 9/1998 | Lemelson |
| 5,835,868 | A | 11/1998 | McElroy et al. |
| 5,835,881 | A | 11/1998 | Trovato et al. |
| 5,867,780 | A | 2/1999 | Malackowski et al. |
| 5,870,667 | A | 2/1999 | Globuschutz |
| 5,877,723 | A | 3/1999 | Fan |
| 5,937,355 | A | 8/1999 | Joong et al. |
| 5,940,481 | A | 8/1999 | Zeitman |
| 5,940,503 | A | 8/1999 | Palett et al. |
| 5,943,429 | A | 8/1999 | Handel |
| 5,945,985 | A | 8/1999 | Babin et al. |
| 5,946,343 | A | 8/1999 | Schotz et al. |
| 5,956,683 | A | 9/1999 | Jacobs et al. |
| 5,960,399 | A | 9/1999 | Barclay et al. |
| 5,963,861 | A | 10/1999 | Hanson |
| 6,006,148 | A | 12/1999 | Strong |
| 6,011,786 | A | 1/2000 | Dent |
| 6,019,475 | A | 2/2000 | Lynam et al. |
| 6,037,880 | A | 3/2000 | Manion |
| 6,044,266 | A | 3/2000 | Kato |
| 6,052,604 | A | 4/2000 | Bishop, Jr. et al. |
| 6,085,428 | A | 7/2000 | Casby et al. |
| 6,105,060 | A | 8/2000 | Rothblatt |
| 6,111,539 | A | 8/2000 | Mannings et al. |
| 6,111,964 | A | 8/2000 | Ishibashi |
| 6,125,284 | A | 9/2000 | Moore et al. |
| 6,128,482 | A | 10/2000 | Nixon et al. |
| 6,151,539 | A | 11/2000 | Bergholz et al. |
| 6,154,658 | A | 11/2000 | Caci |
| 6,154,662 | A | 11/2000 | Norton et al. |
| 6,157,317 | A | 12/2000 | Walker |
| 6,161,071 | A | 12/2000 | Shuman et al. |
| 6,163,752 | A | 12/2000 | Sievers et al. |
| 6,199,013 | B1 | 3/2001 | O'Shea |
| 6,202,008 | B1 | 3/2001 | Beckert et al. |
| 6,206,283 | B1 | 3/2001 | Bansal et al. |
| 6,208,927 | B1 | 3/2001 | Mine et al. |
| 6,211,798 | B1 | 4/2001 | Albrecht et al. |
| 6,212,473 | B1 | 4/2001 | Stefan et al. |
| 6,233,452 | B1 | 5/2001 | Nishino |
| 6,240,365 | B1 | 5/2001 | Bunn |
| 6,243,003 | B1 | 6/2001 | DeLine et al. |
| 6,249,233 | B1 | 6/2001 | Rosenberg et al. |
| 6,275,231 | B1 | 8/2001 | Obradovich |
| 6,279,946 | B1 | 8/2001 | Johnson et al. |
| 6,292,781 | B1 | 9/2001 | Urs et al. |
| 6,296,280 | B1 | 10/2001 | Struble et al. |
| 6,308,126 | B2 | 10/2001 | Yokoyama et al. |
| 6,317,684 | B1 | 11/2001 | Roeseler et al. |
| 6,321,162 | B1 | 11/2001 | Hessing |
| 6,334,089 | B2 | 12/2001 | Hessing |
| 6,336,090 | B1 | 1/2002 | Chou et al. |
| 6,344,806 | B1 | 2/2002 | Katz |
| 6,349,329 | B1 | 2/2002 | Mackintosh et al. |
| 6,351,698 | B1 | 2/2002 | Kubota et al. |
| 6,353,785 | B1 | 3/2002 | Shuman et al. |
| 6,363,324 | B1 | 3/2002 | Hildebrant |
| 6,370,237 | B1 | 4/2002 | Schier |
| 6,370,506 | B1 | 4/2002 | Ahluwalia |
| 6,374,214 | B1 | 4/2002 | Friedland et al. |
| 6,377,210 | B1 * | 4/2002 | Moore ..... 342/357.13 |
| 6,389,332 | B1 | 5/2002 | Hess et al. |
| 6,389,389 | B1 | 5/2002 | Meunier et al. |
| 6,393,403 | B1 | 5/2002 | Majaniemi |
| 6,405,027 | B1 | 6/2002 | Bell |
| 6,408,272 | B1 | 6/2002 | White et al. |
| 6,421,607 | B1 | 7/2002 | Gee et al. |
| 6,441,790 | B1 | 8/2002 | Forrester et al. |
| 6,453,020 | B1 | 9/2002 | Hughes et al. |
| 6,481,622 | B2 | 11/2002 | Hjelmvik |
| 6,484,174 | B1 | 11/2002 | Wall et al. |
| 6,487,402 | B1 | 11/2002 | Faus et al. |
| 6,487,494 | B2 * | 11/2002 | Odinak et al. ..... 701/202 |
| 6,496,776 | B1 * | 12/2002 | Blumberg et al. ..... 701/213 |
| 6,496,799 | B1 | 12/2002 | Pickering |
| 6,516,466 | B1 | 2/2003 | Jackson |
| 6,519,329 | B1 | 2/2003 | Hjelmvik |
| 6,526,335 | B1 | 2/2003 | Treyz et al. |
| 6,526,486 | B2 | 2/2003 | Theimer |
| 6,571,175 | B1 * | 5/2003 | Chen ..... 701/211 |
| 6,615,381 | B1 | 9/2003 | Fukuda et al. |
| 6,628,928 | B1 | 9/2003 | Crosby et al. |
| 6,671,617 | B2 | 12/2003 | Odinak et al. |
| 6,765,497 | B2 | 7/2004 | Ablay et al. |
| 6,779,196 | B1 | 8/2004 | Igbinadolor |
| 6,810,323 | B1 | 10/2004 | Bullock et al. |
| 6,895,238 | B2 | 5/2005 | Newell et al. |
| 2001/0010500 | A1 | 8/2001 | Lundin et al. |
| 2001/0014863 | A1 | 8/2001 | Williams, III |
| 2001/0016500 | A1 | 8/2001 | Son et al. |
| 2001/0020211 | A1 | 9/2001 | Takayama et al. |
| 2001/0021646 | A1 | 9/2001 | Antonucci et al. |
| 2001/0030598 | A1 | 10/2001 | Deline et al. |
| 2001/0033643 | A1 | 10/2001 | Mulvey et al. |
| 2002/0028655 | A1 | 3/2002 | Rosener et al. |
| 2002/0065037 | A1 | 5/2002 | Messina et al. |
| 2002/0068543 | A1 | 6/2002 | Shah |
| 2002/0069071 | A1 | 6/2002 | Knockeart et al. |
| 2002/0075168 | A1 | 6/2002 | Ablay et al. |
| 2002/0103639 | A1 | 8/2002 | Chang et al. |
| 2002/0111172 | A1 | 8/2002 | DeWolf et al. |
| 2002/0113203 | A1 | 8/2002 | Heslin et al. |
| 2002/0140545 | A1 | 10/2002 | Nietupski et al. |
| 2002/0142803 | A1 | 10/2002 | Yamamoto |
| 2002/0143999 | A1 | 10/2002 | Yamagami |
| 2002/0158753 | A1 | 10/2002 | DeLine et al. |
| 2002/0173347 | A1 | 11/2002 | Kinnunen |
| 2003/0169160 | A1 | 9/2003 | Rodriguez et al. |
| 2004/0110515 | A1 | 6/2004 | Blumberg et al. |
| 2005/0028208 | A1 | 2/2005 | Ellis et al. |

FOREIGN PATENT DOCUMENTS

| | | | |
|---|---|---|---|
| EP | 00800092 | A | 10/1997 |
| EP | 0829704 | | 3/1998 |
| EP | 1160543 | A | 12/2001 |
| FR | 02762906 | | 11/1998 |
| FR | 2762906 | A | 11/1998 |
| JP | 04219783 | | 8/1992 |
| JP | 07159186 | | 6/1995 |
| JP | 08044996 | | 2/1996 |
| WO | WO9909374 | | 2/1999 |

OTHER PUBLICATIONS

Nusser, et al., Bluetooth-based wireless connectivity in an automatic environment, Vehicular Technology Conference, 2000. IEEE-VTS,

(56) References Cited

OTHER PUBLICATIONS

Fall VTC 200. 52nd, pp. 2541-2548, vol. 6, Sep. 24-28, 2000, Boston, MA, USA, entire document.
Stirling, A., Mobile multimedia platforms, Vehicular Technology Conference, 2000. IEEE-VTS Fall VTC 200. 52nd, pp. 2541-2548, vol. 6, Sep. 24-28, 2000, Boston, MA, USA, entire document.
Jameel, et al., Interest multimedia on wheels: connecting cars to cyberspace, Intelligent Transportation System, 1997. ITSC'97, IEEE Conference, pp. 637-642, Nov. 9-12, 1997, Boston, MA, USA, entire document.
Kushner, et al., Effects of subtractive-type speech enhancement/noise reduction algorithms on parameter estimation for improved recognition and coding in high noise environments, vol. 1, ICASSP-89, May 23-26, 1989, pp. 211-221.
Boll, Steven F., Supression of acoustic noise in speech using spectral subtraction, IEEE Transaction on ASSP, vol. ASSP-2 No. 2, Apr. 1979.
Un and Choi, Improving LPC analysis of noisy speech by autocorrelation subtraction method, ICASSP 81 Proceedings, Mar. 30-Apr. 1, 1981, pp. 1082-1085.

* cited by examiner

VEHICLE NAVIGATION SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application claims priority from earlier filed U.S. Provisional Patent Application Serial No. 60/364,538 filed Mar. 15, 2002, and is a Continuation-in-Part of U.S. patent application Ser. No. 09/884,856 filed Jun. 18, 2001, now U.S. Pat. No. 6,487,494, which claims priority from earlier filed U.S. Provisional Patent Application Serial No. 60/280,378 filed Mar. 29, 2001.

FIELD OF THE INVENTION

This invention relates generally to communication and computing systems and methods and, more specifically, to a system and method for directing a motorist to a destination.

BACKGROUND OF THE INVENTION

With advances in on-board vehicle computer systems and wireless technologies, vehicle navigation systems that provide users with current location and driving directions to a desired destination have become a reality. Vehicle navigation systems have taken one of two forms: on-board systems and network-based systems. On-board systems are driven by a computer and associated database resident in each vehicle. These systems generate driving instructions based on user voice or keyboard input and map information stored in the on-board computing system. Network-based navigation systems do not rely on an on-board computer and associated database, but rather provide a voice interface to an off-vehicle computer or human information provider.

Significant disadvantages exist with both forms of vehicle navigation systems. The on-board navigation system requires expensive and quickly outdated computer hardware. Moreover, with the on-board computing approach, the database needs to be updated periodically to maintain current navigation information. Indeed, such systems can never really be up to date or comprehensive as they rely on external updates, typically via a CD-ROM or other removable electronic storage medium. The network-based system requires an open wireless link to the server. In these systems, the user typically dials a number and gives their starting and ending addresses (current location and destination). The system computes the route and vocally recites it to the user turn by turn. If the user hangs up, or is otherwise disconnected, they need to call again and give their new location and the destination address. Maintaining an active phone connection, especially in a situation involving long distance travel, is inefficient and expensive, as well as distracting to the vehicle user.

In addition, existing vehicle navigation systems provide directions based on street and road names. Directions provided in this manner do not provide a great comfort to drivers, because drivers new to an area are uncomfortable when traveling without a distinct knowledge that they are in the correct place.

Thus, there is a need for a system and method that addresses the disadvantages associated with current attempts at vehicle navigation systems.

SUMMARY

The present invention provides a vehicle navigation system and method. The system includes a unit located in a vehicle and coupled to a first network, a traffic information center coupled to a second network, and a server coupled to the first and second networks. The unit includes a first component that initiates a trip request, a second component that determines vehicle coordinates, and a user interface. The traffic information center generates road information. The server includes a receiving component that receives the determined vehicle coordinates and the trip request information from the unit over a network. The server also includes a component that retrieves road information from the traffic information center based on the received vehicle coordinates and the trip request information, and memory that stores navigation information. The server includes a trip plan component that generates a trip plan according to the navigation information, the received vehicle coordinates, the trip request information, and the retrieved road information, and a transmission component that sends the generated trip plan to the unit. The generated trip plan includes a table of locations of the trip plan with associated navigation prompts. The user interface presents the navigation prompts based on present vehicle location information.

In accordance with further aspects of the invention, the user interface includes a component that compares present vehicle coordinates to the trip plan table. The user interface presents a navigation prompt, if, according to the comparison component, the vehicle coordinates are within a threshold value from a location in the table associated with the navigation prompt.

In accordance with still further aspects of the invention, the unit further includes a component that determines distance of the vehicle coordinates to the trip plan. If the vehicle coordinates are determined not to be within a threshold value from the trip plan, a component makes a request to pause the trip plan, and to resume the trip plan when instructed.

In accordance with yet other aspects of the invention, the trip plan component generates trip overview information.

In accordance with other aspects of the invention, the trip plan further includes one or more voice prompts associated with one or more landmarks.

In accordance with further aspects of the invention, the present invention generates tourist information based on the vehicle location information at a server, sends the tourist information from the server to the vehicle over the network, and presents the tourist information in the vehicle.

As will be readily appreciated from the foregoing summary, the invention provides a system and method for easing the burden of driving in unfamiliar areas.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
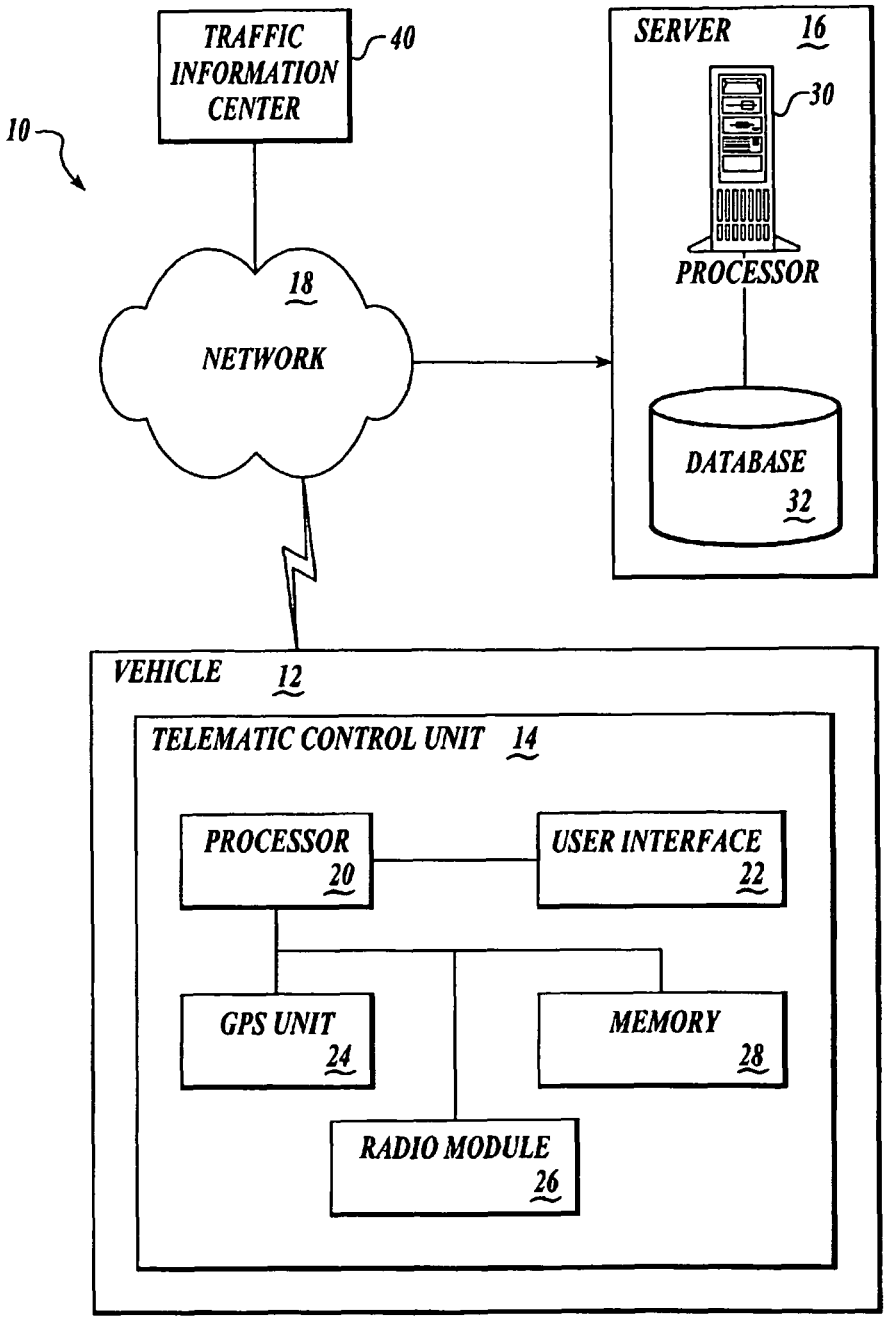
FIG. 1 is a diagram illustrating the general architecture of a system that operates in accordance with the present invention.

The present invention, as shown in FIG. 1, is a vehicle navigation system 10 that includes a vehicle 12 with an in-vehicle telematic control unit (TCU) 14. TCU 14 is in wireless communication with a server 16 over a network 18. Network 18 preferably includes components for receiving wireless signals from TCU 14 and converting the signals for wire or wireless transmission to server 16. The network 18 is preferably the Internet, but could be any public or private data network. Network 18 includes a gateway (not shown) that can send and receive wireless signals to and from TCU 14, and can communicate through other components (e.g., routers) in the network to server 16. The wireless signals include information that is preferably in packet form, although the information may be in alternative forms. TCU 14 includes a processor 20 coupled to a user interface 22, a global positioning system (GPS) unit 24, a radio module 26, and local storage or memory 28. User interface 22 preferably includes a speaker and a microphone (not shown), and may include a display. The user interface may also include on-or-off screen user interface buttons. Radio module 26 is capable of sending and receiving both voice and data. Server 16 includes a processor 30 and a database 32 that holds vehicle navigation information: maps, road conditions and terrain, lane information and changes, touring instructions, etc. Server 16 also receives road and traffic information over network 18 from a traffic information center 40, such as a local news agency or government transportation department.

System 10 of the present invention minimizes the amount of airtime used between TCU 14 and server 16 to send a trip plan. When a user asks the system for directions, the vehicle's local coordinates (as determined by GPS unit 24) are sent from TCU 14 to server 16 over network 18. The user also specifies their destination to the TCU. Entry of the user's navigation instruction request, including the destination information, is preferably done vocally through the microphone, but may be accomplished by other data entry means, such as via user interface buttons. The TCU transmits the vocalized destination to server 16. The server calculates the trip plan and generates a table of locations (expressed as location coordinates, such as GPS coordinates) and the corresponding navigation prompts (e.g. turn left onto Howel St.). These navigation prompts are preferably voice prompts, but may include other forms of user notification, such as textual messages or different audible, visual, or other signals. The table with navigation prompts is sent to TCU 14 in vehicle 12. In an alternate embodiment, the navigation prompts are sent as an audio file (assuming voice prompts), such as a WAV file or an MP3 file.

In another embodiment, the table includes locations identified in text form that are displayed or converted to audio by a text-to-speech (TTS) component of processor 20. The navigation prompts could also include recordings of common words such as "turn," "left," "onto," "street," and "avenue," or segments of words (i.e. "turn left onto"). The word or segment recordings are sent once by server 16 to TCU 14 and stored in TCU 14, or are previously saved in TCU 14. The sent trip plan table includes a location voice prompt (i.e., "Howell Street") and an address identifier. TCU 14 generates a voice direction instruction by combining the stored word or segment recording associated with the address identifier and the location voice prompt. As the vehicle moves according to the trip plan and arrives at a location whose GPS coordinates match those of an entry in the table, the corresponding voice prompt is played through the speakers to the system user. This process is described in more detail in FIG. 2.

Figure 2:
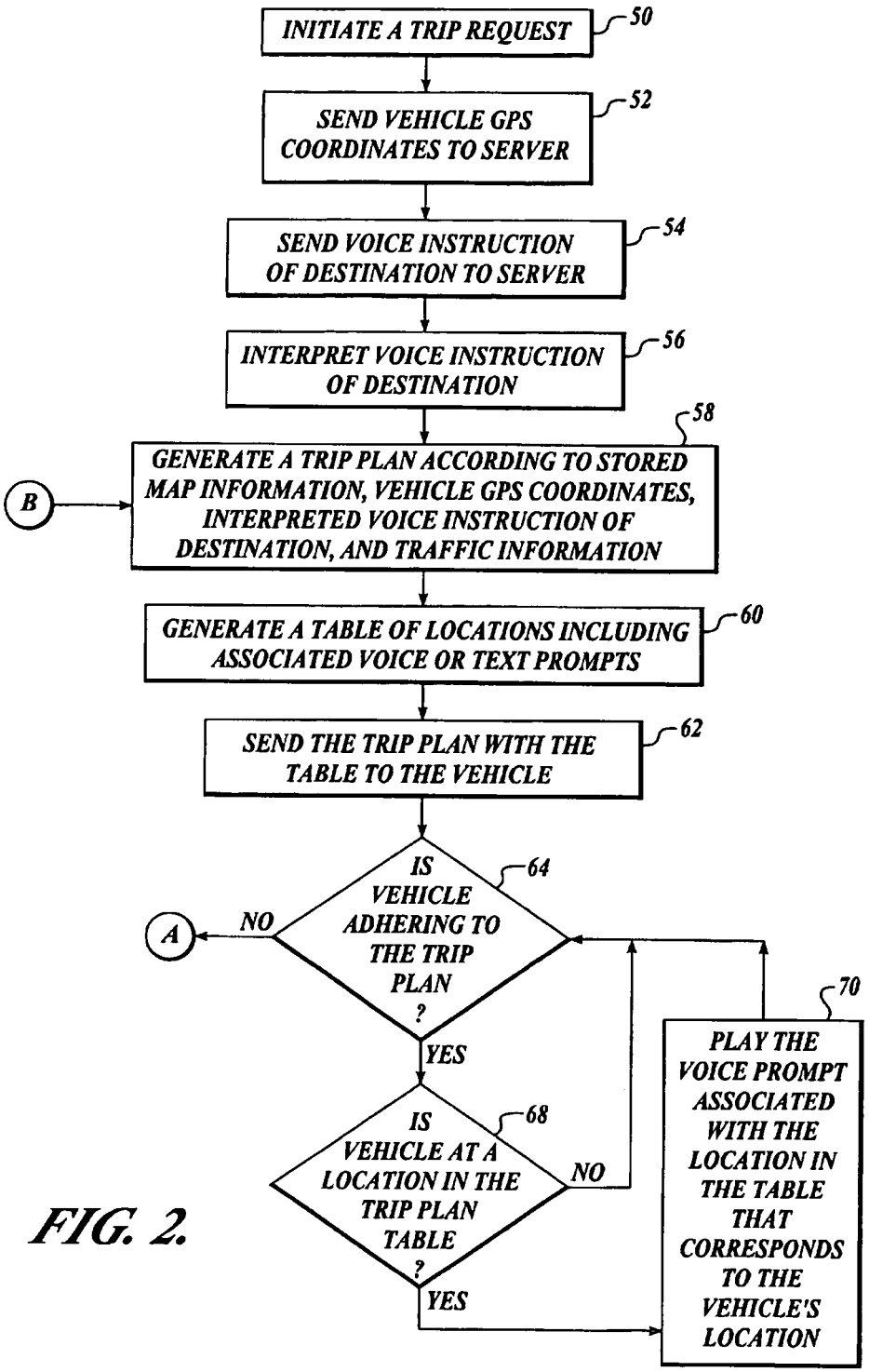
FIGS. 2-4 are flow charts illustrating various embodiments performed by the system shown in FIG. 1.

FIG. 2 is a flow diagram of a process performed by system 10 shown in FIG. 1. First, at block 50, the user initiates a trip request. Trip request initiation can occur in a number of ways. For example, the user may select a trip request button included in user interface 22, or speak a start trip request command into the microphone that is interpreted by voice recognition software executed by processor 20; either action causes processor 20 to begin a trip request. At blocks 52 and 54, the initiated trip request causes TCU 14 to send the vehicle's GPS coordinates and any user-entered instructions of the destination to server 16. At block 56, server 16 interprets the voice instructions to determine the destination. Interpreting includes performing voice recognition processing. Next, at block 58, server 16 generates a trip plan according to traffic and road maintenance information retrieved from the traffic information center 40, vehicle navigation information such as stored map or other navigation information, the vehicle GPS coordinates, and the interpreted voice instructions of the destination. At block 60, a table of locations is generated for the trip plan. The table includes trip plan information, such as landmarks, turns, road changes, or other significant travel-related information. Each location entry in the table includes an associated voice or text prompt. For example, a voice prompt may be "turn left on Elm Street, you should see a taco restaurant on the corner." The number of landmarks used in a trip plan can vary depending upon user desires for navigating with more or less landmarks. At block 62, the trip plan including the table is sent to the TCU.

Figure 3:
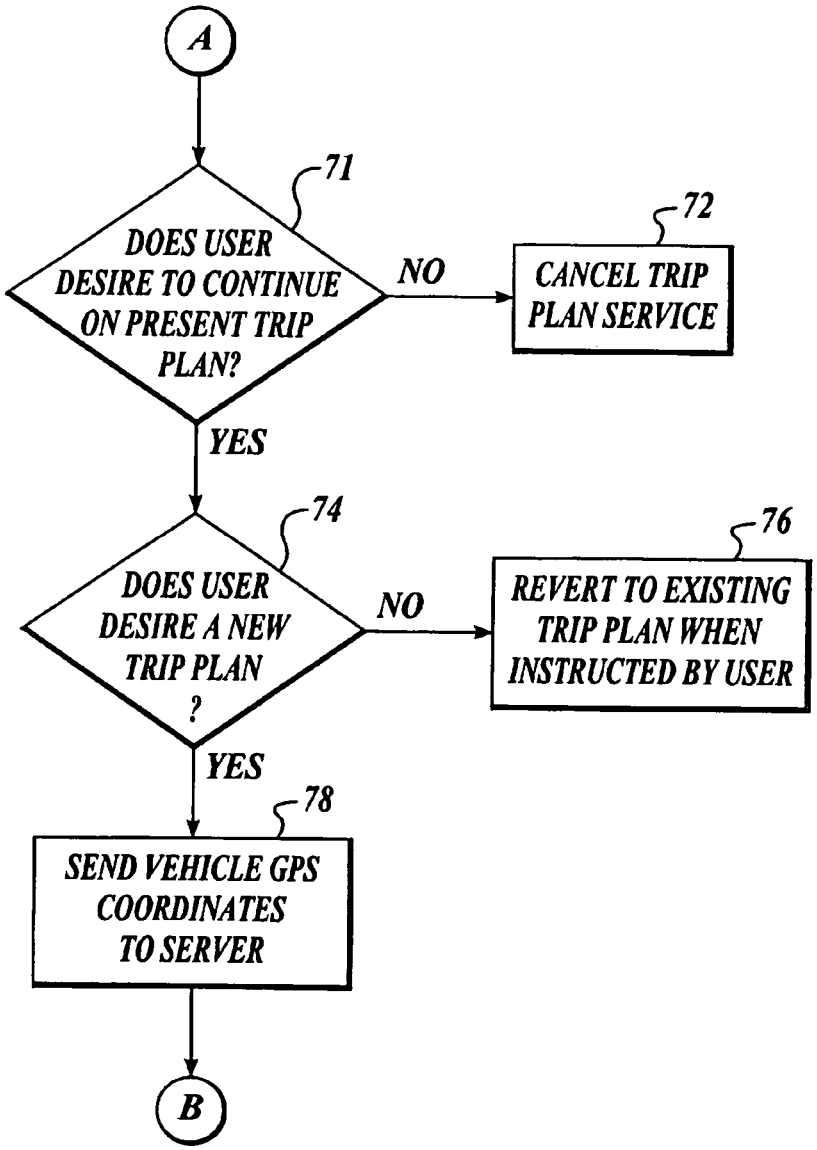

At decision block 64, once the vehicle receives the trip plan table, TCU 14 determines if the vehicle is adhering to the trip plan. The TCU periodically checks the vehicle's GPS location and determines if it is on the trip plan or within a threshold value from the trip plan. This threshold value may be a function of the distance from a known location in the trip plan, or location relative to known geographic marks, or some combination of various factors. Within the threshold value, the system can document the present location of the vehicle in relation to the trip plan and chart the navigational path to return to the trip plan or a modified trip plan. If the vehicle is not adhering to the trip plan, the process continues as shown in FIG. 3. If the TCU determines the vehicle is adhering to the trip plan, the TCU determines whether the vehicle is at an identified location within the trip plan table (decision block 68). If the vehicle is not at a location identified in the trip plan table, the process continues checking locations according to decision blocks 64 and 68. If the vehicle is at a location in the trip plan table or within a threshold value from a location in the table, TCU 14 plays the voice prompt associated with the location in the table that corresponds to the vehicle's location (block 70). In another embodiment, voice recordings associated with prestored symbols are played in series with a proper-noun street identifier. Then, the process continues checking vehicle location according to decision blocks 64 and 68.

As shown in FIG. 3, if it is determined, at decision block 64, that the vehicle is not adhering to the trip plan, a voice prompt asks the user if they are taking a temporary detour from the trip plan and plan on returning to the trip plan, or are canceling the trip plan (decision block 71). The voice prompt is stored at TCU 14 or sent to TCU 14 from server 16. If the user responds with a desire to discontinue the trip plan, the trip plan is canceled (block 72). However, if the user responds with an indication that they do not desire to cancel the trip plan, for example because of a detour for food or other reasons, TCU 14 or server 16 inquires whether the user would like to continue with the present trip plan or would like a new trip plan after the detour (decision block 74). If the user responds with a request to continue using the present trip plan, TCU 14 present voice prompts from the present trip plan after the user indicates a restart (block 76). However, if the user responds with a request for a new trip plan, TCU 14 sends present vehicle GPS coordinates to server 16 (block 78). Then, the process reverts to block 58 in FIG. 2 using the new vehicle coordinate and the previous voice instructions of the destination.

In an alternate embodiment, the system may cache parts of a voice prompt that are later combined by processor 20 to create a navigation instruction. For example, TCU 14 receives the following voice prompts from server 16:

(a) "turn left onto Howell Street";

(b) "turn left onto 4th Avenue".

A caching component performed by processor 20 caches 3 sub-prompts:

#17 "turn left"

#18 "Howell Street"

#19 "4th Avenue".

The tag identifiers for the (a) and (b) voice prompts include tag identifiers for the sub-prompts (i.e. a=#17 #18; b=#17 #19). So in effect, in this alternate embodiment, each tag is a series of sub-tags. Server 16 may send just the tag identifiers for the sub-prompts. Processor 20 combines the sub-prompts according to the order the tag identifiers were received and presents the combination to the user.

Figure 4:
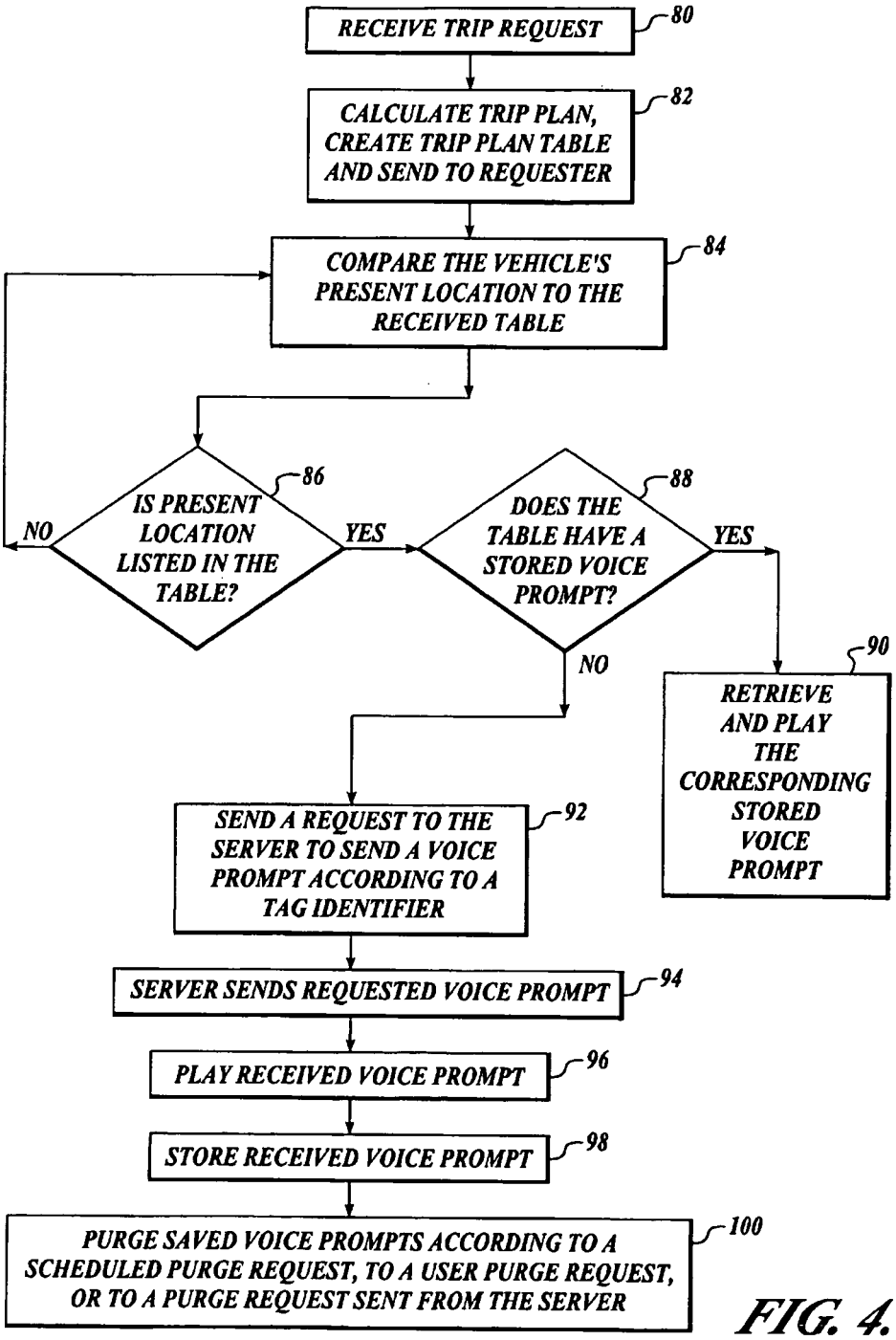

Maps can also be cached at TCU 14. When a route is retrieved, a request is made for additional maps that either intersect the route or are within a specified proximity of any point along the route. For example, when a route is retrieved, a request is made for one square mile maps that either intersect the route or are within one mile of any point along the route. The present invention preferably uses a uniform map size and position, for example based on one square mile map tiles, regularly spaced and non-overlapping, thereby making map retrieval and caching easy FIG. 4 is a flow diagram of an alternative process performed by system 10 shown in FIG. 1. First, at block 80, the user sends a trip request to server 16 (see blocks 50-56 of FIG. 2). At block 82, the server calculates a trip plan, creates a trip plan table according to the calculated trip plan, and sends the trip plan table to the user's TCU 14. The trip plan table includes locations and associated navigation (preferably voice) prompts. At block 84, as the user is traveling according to their trip plan, TCU 14 compares the vehicle's present location (preferably GPS generated) to the received table. At decision block 86, if the vehicle's present location is not in the trip plan table, the process returns to block 84, where it continues comparing the vehicle's present location to the entries in the trip plan table. If there is a corresponding location entry in the trip plan table, the logic proceeds to decision block 88. At decision block 88, if the table has a corresponding stored voice prompt, TCU 14 retrieves and plays the corresponding stored voice prompt (block 90). If, at decision block 88, TCU 14 determines that a corresponding voice prompt does not exist in the table or elsewhere in memory 28, the TCU sends a request to the server to send a voice prompt according to a tag identifier that indicates the missing voice prompt (block 92). At block 94, server 16 sends the requested voice prompt. At block 96, the TCU plays the received voice prompt. At block 98, the TCU stores the received voice prompt for possible later use. At block 100, the TCU purges saved voice prompts according to a scheduled purge request, to a user purge request, or to a purge request sent from the server 16.

In an alternate embodiment, the steps performed at blocks 82-84 are performed at server 16, and the server does not send the table to the requester, but compares the vehicle's present location (GPS generated) to the server-generated table. If an associated voice prompt is present, the server sends a tag identifier associated with the voice prompt to TCU 14. The TCU compares the sent tag identifier to previously received voice prompts that are stored in memory 28 according to assigned tag identifiers. If an appropriate voice prompt is in memory 28, processor 20 retrieves it and presents it to the user via user interface 22. If a voice prompt is not found, TCU 14 sends a request to server 16 for the actual voice prompt, which is presented to the user when received from the server.

In one embodiment, the generated trip plan includes a voice overview of the generated trip plan. The longest stretches of road in the trip plan, preferably the four longest stretches of road, are determined. The determined longest stretches are converted to voice and included in the voice overview in the order in which the stretches occur in the trip plan. For example, if one is to travel from Seattle to San Francisco, the voice overview is as follows: "I-5 South, I-205 South, I-5 South, I-80 West." A stretch of road in the trip is selected for the voice overview based on a stretch of length threshold value, the length of the stretch relative to other stretches in the trip plan, or an identifier associated with a stretch that identifies the stretch of road as a trip overview stretch of road.

For shorter trips, the effective lengths of the road segments are preferably altered by adding lengths of minor stretches of adjacent or connected road to the road segments. For example, if a short trip takes a person onto a highway and then off that highway at the next exit, that segment of road (the highway) is relatively short. The length of the onramp and off ramp is added to the highway segment to give the highway segment more length so that it can be used in a trip plan overview for a short trip. In other words, if a highway segment is 0.25 miles long, and the preceding onramp and following off ramp are 0.1 and 0.35 miles, respectively, the device that generates the trip plan overview considers the ramps as part of the highway segment. In this case, the highway segment is considered 0.7 miles long.

In another embodiment, server 16 generates a tour guide trip plan table or presents tour guide information while in an area. A driver that is new in town, such as a tourist or a business traveler, requests tour guide information. TCU 14 receives tour guide voice prompts and associated location information from server 16 based on vehicle location information sent to server 16 and the user's request. TCU 14 presents a tour guide voice prompt if the vehicle's location is within a threshold distance of the location associated with the voice prompt. An example voice prompt is: "The church approaching on your left is historically significant. Would you like to hear about it?" With the driver's acceptance, TCU 14 plays a recorded script received from server 16. The recorded script could be read as text-to-speech, or from pre-recorded voice talent. The driver is given the option of hearing more about the church, or possibly moving to other topics (i.e., other churches in the area, general information about regional architecture, etc.)

In an alternate embodiment, server 16 responds to specific service requests made by a user while traveling. For example, a user may wish to know about the nearest location of some kind of business service. For example, while on a road trip the kids in a vehicle are getting hungry and want pizza. The driver tells TCU 14 that they want to know where the nearest pizza parlor is. The pizza parlor request and present vehicle location information are sent to the server 16. Server 16 determines if any pizza parlors are proximate to the vehicle based on the vehicle location information, and sends information about proximate pizza parlors to TCU 14. TCU 14 announces when a pizza parlor is nearby, or provides the distance and directions to the nearest pizza parlor. The response from server 16 may be immediate, or may take some time before server 16 identifies a proximate pizza parlor. Other businesses or service requests could be banks, supermarkets, drug stores, etc.

In an alternate embodiment, extra maps, navigation information, or other information are sent to TCU 14 when server 16 determines that the vehicle is coming close to the edge of a wireless communication coverage area. Server 16 makes this determination based on vehicle coordinate information sent to server 16 by TCU 14 and known wireless coverage information or based on a strength value of any signals communicated between TCU 14 and server 16. In one embodiment, after server 16 determines that the vehicle is coming close to the edge of a wireless communication coverage area, a prompt is sent to TCU 14. The prompt asks the user if they desire to receive the extra maps, navigation information, or other information. If the user positively responds to the prompt, TCU 14 notifies server 16 to send the associated information. Then, server 16 sends the associated information.

In another embodiment, an area information prompt is sent to TCU 14 by server 16. The area information prompt asks the user if they wish to receive information about areas (neighborhoods/towns) that the user will be traveling through, or information about the next N miles of the user's present trip. If the user positively responds to the area information prompt, TCU 14 notifies server 16 to send the associated information. Then, server 16 sends the associated information.

In another embodiment, server 16 sends map display information via network 18 to TCU 14. TCU 14 uses a personal data assistant (PDA—Windows CE, Palm, etc.) as a display device to present the sent map display information. The customer plugs the PDA into a car-mounted cradle that provides a wired connection to TCU 14. The PDA may also be connected to TCU 14 via a wireless connection, for example bluetooth/802.11, when within a predetermined distance from TCU 14. In the wireless example, TCU 14 or radio module 26 and the PDA include wireless communication components for sending and receiving wireless communication to and from the PDA. When a PDA is coupled to TCU 14, the PDA becomes the display device of TCU user interface 22. Processor 20 of TCU 14 sends map display information received from server 16 to the PDA. The PDA includes a display processor that processes the received map display information and displays the processed map display information on the display of the PDA. The PDA may also directly display the map display information on the display of the PDA if the map display information is in the display format of the PDA.

The map display information includes details information. The details information includes more information about features shown in the displayed map. The PDA may include an application program that allows the user to view more information about a road feature or a more complicated feature displayed on the map presented on the display of the PDA. By clicking on the road or more complicated feature, like a park or coastline, the application program retrieves feature name and perhaps other feature information based on the details information, and highlights or presents the retrieved information on the display of the PDA.

A destination address may be selected out of an address book in the driver's PDA. The selected destination address is sent to server 16, whereby the server sends map information to TCU 14 based on the sent destination address. Then, TCU 14 displays the received map information on the PDA display.

While the preferred embodiment of the invention has been illustrated and described, as noted above, many changes can be made without departing from the spirit and scope of the invention. For example, the types of communication between the vehicle and the server may be all wireless, the components of the server may be distributed over the network, and the location identifier may be a non-satellite system that determines vehicle location based on ground-based transmitters. Also, the order of the steps performed in the described embodiments may be altered without departing from the scope of the invention. By way of example, the steps performed at blocks 96 and 98, playing and storing received voice prompts, could be performed in the reverse order. Accordingly, the scope of the invention is not limited by the disclosure of the preferred embodiment.

The embodiments of the invention in which an exclusive property or privilege is claimed are defined as follows:

1. A vehicle navigation method comprising:

initiating a trip request, including trip request information;

determining vehicle coordinates;

sending vehicle coordinates and the entered trip request information to a server over a network;

retrieving at the server road information based on the vehicle coordination and entered trip request information from an information center over a network connection;

generating a trip plan according to navigation information stored in a memory associated with the server, [the vehicle coordinates, the trip request information, and the retrieved road information, wherein] the generated trip plan [includes] *having* a table of locations of the trip plan with associated navigation prompts*, the vehicle coordinates, retrieved road information, and the trip request information;*

*defining a threshold value to ascertain adherence to the trip plan*;

sending the generated trip plan table to the vehicle over the network;

[comparing] *determining whether* present vehicle coordinates *are within the threshold value* to the trip plan table; and

[if, according to the comparison, the vehicle coordinates are within a threshold value from a location in the table, presenting the navigation prompt associated with the location in the table that is within the threshold value of the vehicle's location]

*presenting the navigation prompts with the table of locations to confirm adherence to the trip plan.*

2. The method of claim 1, wherein the road information includes traffic information.

3. The method of claim 1, wherein the navigation prompts include voice prompts.

4. The method of claim 1, further comprising determining if the vehicle is adhering to the trip plan, wherein determining adherence comprises:

determining distance of the vehicle coordinates to the trip plan; and if the vehicle coordinates are not within a threshold value from the trip plan, making a request to pause the trip plan, and resuming the trip plan when instructed.

5. The method of claim 1, wherein generating comprises generating trip overview information, and further comprising:

presenting the trip overview information within the vehicle.

6. The method of claim 5, wherein the trip overview information includes a voice prompt that includes legs of the trip plan that meet a predetermined trip overview requirement.

7. The method of claim 1, wherein the trip plan further includes one or more voice prompts associated with one or more landmarks.

8. A vehicle navigation system comprising:

a unit located in a vehicle, the unit comprising:

a first component configured to initiate a trip request;

a second component configured to determine vehicle coordinates; and a user interface;

a traffic information center coupled to a network configured to generate road information; and a server comprising:

a receiving component configured to receive the determined vehicle coordinates and the trip request information from the unit over a network;

a component configured to retrieve road information from the traffic information center based on the received vehicle coordinates and the trip request information;

a memory configured to store navigation information;

a trip plan component configured to generate a trip plan according to the navigation information, the received vehicle coordinates, the trip request information, and the retrieved road information, wherein the generated trip plan includes a table of locations of the trip plan with associated navigation prompts *and a threshold value to ascertain a level of adherence to the trip plan*; and a transmission component configured to send the generated trip plan to the unit, wherein the user interface is configured to present the navigation prompts based on present vehicle location information *with the level of adherence to the trip plan*.

9. The system of claim 8, wherein the user interface comprises:

a component configured to compare present vehicle coordinates to the trip plan table, wherein the user interface presents a navigation prompt, if, according to the comparison component, the vehicle coordinates are within a threshold value from a location in the table associated with the navigation prompt.

10. The system of claim 8, wherein the road information includes traffic information.

11. The system of claim 8, wherein the navigation prompts include voice prompts.

12. The system of claim 8, wherein the unit further comprises:

a component configured to determine distance of the vehicle coordinates to the trip plan; and a component configured to make a request to pause the trip plan, and to resume the trip plan when instructed, if the vehicle coordinates are determined to not be within a threshold value from the trip plan.

13. The system of claim 8, wherein the trip plan component is further configured to generate trip overview information, and the user interface is further configured to present the trip overview information within the vehicle.

14. The system of claim 13, wherein the trip overview information includes a voice prompt that includes legs of the trip plan that meet a predetermined trip overview requirement.

15. The system of claim 8, wherein the trip plan further includes one or more voice prompts associated with one or more landmarks.

16. A vehicle navigation method comprising:

initiating a trip request, including trip request information;

[determining vehicle coordinates;]

sending *a set of* vehicle coordinates and the entered trip request information to a server over a network;

[retrieving at the server road information based on the vehicle coordinates and entered trip request information from an information center over a network connection;]

generating a trip plan according to navigation information stored in a memory associated with the server, [the vehicle coordinates, the trip request information, and the retrieved road information, wherein] the generated trip plan [includes] *having* an electronic map and a table of locations of the trip plan with associated navigation prompts;

sending the generated trip plan table to the vehicle over the network;

[comparing present vehicle coordinates to the trip plan table;

if, according to the comparison, the vehicle coordinates are within a threshold value from a location in the table, presenting the navigation prompt associated with the location in the table that is within the threshold value of the vehicle's location;

sending the sent electronic map to a personal data assistant (PDA); and displaying the electronic map on a display of the PDA based on the vehicle's present location]

*defining a threshold value to ascertain adherence to the trip plan;*

*determining whether present vehicle coordinates are within the threshold value to the trip plan table;*

*sending the sent electronic map to a personal data assistant (PDA); and*

*displaying the electronic map on a display of the PDA based on the vehicle's present location with navigation prompts to confirm adherence to trip plan.*

17. The method of claim 16, wherein the electronic map is wirelessly sent to the PDA.

18. The method of claim 16, wherein the electronic map includes detail information that is displayed on the display of the PDA upon selection of an associated feature using a user interface device of the PDA.

19. A vehicle navigation system comprising:

[a unit located in a vehicle, the unit comprising:

a first component configured to initiate a trip request;

a second component configured to determine vehicle coordinates; and a user interface;]

a personal data assistant (PDA) [coupled to the unit], the PDA comprising *a first component configured to determine vehicle coordinates,* a display, and a user interface;

a traffic information center coupled to a network configured to generate road information; and a server comprising:

a receiving component configured to receive the determined vehicle coordinates and the trip request information from the [unit] *PDA* over a network;

a component configured to retrieve road information from the traffic information center based on the received vehicle coordinates and the trip request information;

a memory configured to store navigation information;

a trip plan component configured to generate a trip plan according to the navigation information, the received vehicle coordinates, the trip request information, and the retrieved road information, wherein the generated trip plan includes an electronic map and a table of locations of the trip plan with associated navigation prompts, *and a threshold value to ascertain a level of adherence to the trip plan*; and a transmission component configured to send the generated trip plan to the [unit, wherein the user interface is configured] *PDA* to present the navigation prompts *and threshold values* based on present vehicle location information, wherein the electronic map is sent to the PDA and the PDA displays the electronic map [on the display] *with the level of adherence to the trip plan*.

[20. The system of claim 19, wherein the electronic map is wirelessly sent from the unit to the PDA.]

21. The system of claim 19, wherein the electronic map includes detail information that is displayed on the display of the PDA upon selection of an associated feature using the user interface of the PDA.

* * * * *